United States Patent

[11] 3,598,238

[72] Inventor Henry R. Collins, Jr.
4507 Hemlock, Baytown, Tex. 77520
[21] Appl. No. 846,200
[22] Filed July 30, 1969
[45] Patented Aug. 10, 1971

[54] APPARATUS FOR CLEANING ANALYZER AND OTHER FILTERS
3 Claims, 3 Drawing Figs.
[52] U.S. Cl. ..................................... 210/138,
210/316, 210/333, 210/433
[51] Int. Cl. .................................... B01d 29/38
[50] Field of Search .......................... 210/138,
139, 316, 333, 433

[56] References Cited
UNITED STATES PATENTS
3,043,431 7/1962 Dunley et al. ................. 210/433 X
3,388,799 6/1968 Aymer ........................... 210/333 X
3,478,883 11/1969 Deluca, Jr. ..................... 210/333 X Primary Examiner—John Adee
Attorney—Pravel, Wilson & Matthews ABSTRACT: There are two preferred embodiments to this invention. In one preferred embodiment a dual filter screen, small particle bypass filter is secured with a timing device and valve-switching means to permit sample analyzer stream flow through alternate sides of the filter. The swirling action of the stream flow in the body alternately washes and cleans the small particle filter screen not in use. In the other preferred embodiment a double actuating piston is positioned between the outlet streams of each of the filter caps of the filter body and a timing mechanism actuates the piston to alternately block one of the filtered streams. As the cylinder heads of the piston move into the respective filtered stream, the head moves fluid in the stream back toward the filter body and through the respective filter screen associated with each stream to back wash the respective small particle filter screen and remove clogged materials on the filter screen.

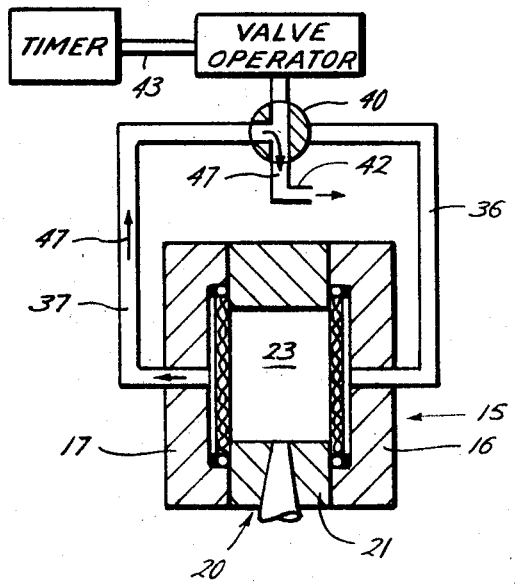
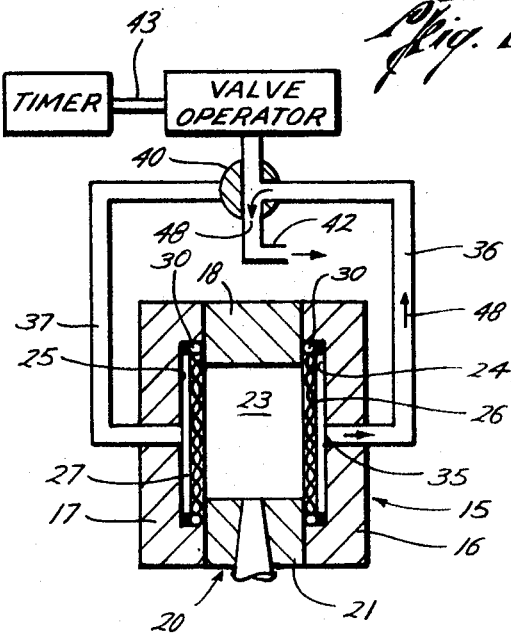
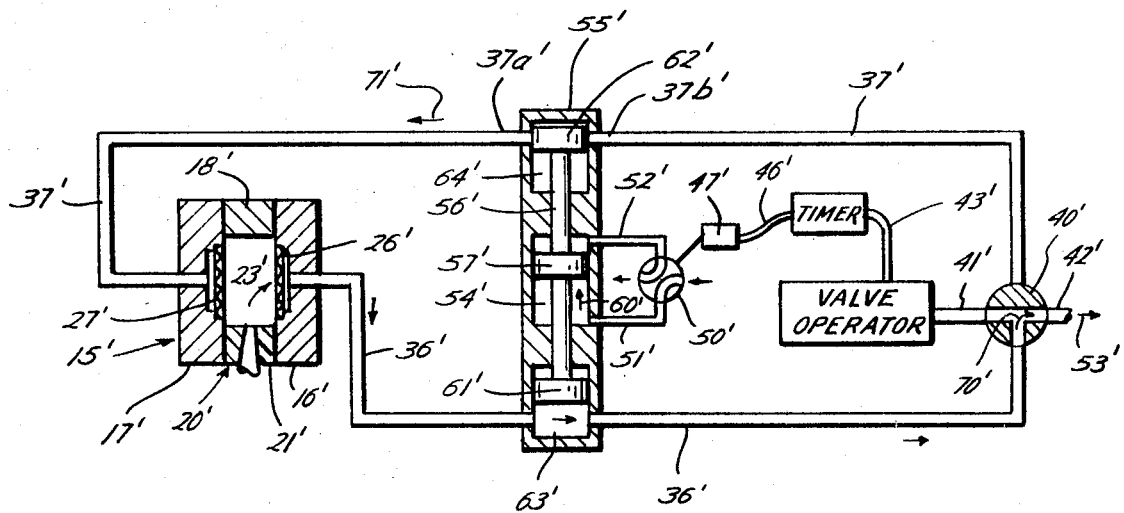

APPARATUS FOR CLEANING ANALYZER AND OTHER FILTERS

CROSS-REFERENCES TO RELATED APPLICATIONS

This application is an improvement over U.S. Pat. No. 3,459,307, filed Oct. 11, 1967 and issued Aug. 5, 1969, by the inventor herein.

BACKGROUND OF THE INVENTION

1. Field of the Invention

This invention relates to a method and apparatus for cleaning analyzer and other type filters.

2. Description of the Prior Art

In the small particle bypass filter described in U.S. Pat. No. 3,459,307 the filter screens are cleaned by the swirling, washing action of the process streams. While such swirling, washing action is sufficient to adequately clean the filter screen, it has been found that the life of the filter screens placed in such small particle bypass filters is limited because of the fact that the analyzer stream flows through each of the filter screens at the same time. Such fluid flow causes each of the screens to become clogged after a certain length of time even though the swirling action of the fluid helps clean such screens.

SUMMARY OF THE INVENTION

Briefly, the present invention relates to a method and apparatus for alternately washing one side of a dual-screen small particle bypass filter by permitting swirling action of the process stream to cleanse the screen adjacent to a blocked side of the filter and to permit flow into an analyzer from the unclogged stream.

The present invention also relates to a method and apparatus for alternately blocking process stream flow to an analyzer system from a dual-screen small particle bypass filter and thereafter alternately backwashing with the sample stream each of the filter screens of the small particle bypass filter.

DESCRIPTION OF THE PREFERRED EMBODIMENTS

As illustrated in FIGS. 1, 2 and 3, a filter body is generally designated as 15. As set forth in my U.S. Pat. No. 3,459,307, the valve body generally designated as 15 includes filter caps 16 and 17 and a central body element or filter 18. As illustrated in FIGS. 1 and 2, an inlet and outlet channel 20 and 21, respectively, are formed in the central body 18 and communicate with a cavity 23 in the central body 18. Each of the filter cap sections 16 and 17 includes recessed portions and 24 and 25, respectively, which communicate with cavity 23 and which receive a filter element and support screen 26 and 27, respectively, adjacent each side of the cavity 23. As further illustrated in FIGS. 1 and 2 and as set forth in my prior patent, O-ring seals 30 are positioned in such recessed portions 24 and 25 to prevent fluid leakage.

An opening 35 in each of said recessed portions communicates with a pair of outlet lines 36 and 37, one of each which is secured with and extends through the respective filter caps 16 and 17. The outlet lines 36 and 37 receive and transmit the filtered sample stream to an analyzer while the remainder of the process stream flows through the inlet 20, into the cavity 23 and out the outlet 21.

A three-way solenoid valve illustrated at 40 receives the outlet from each of the lines 36 and 37 which communicate with the cavity opening 23 in the central body 18. The three-way solenoid valve 40 electrically operates to enable each of the lines 36 and 37 to communicate with a single outlet line 42 from such valve 40. The outlet line 42 is connected to the analyzer for running various tests of the filtered stream. The solenoid valve 40 is connected to a valve operator for hydraulic actuation of the valve as will be set forth hereinbelow. The valve operator is electrically connected through electric conduits 43 to a continuous on-off timer as illustrated in FIGS. 1 and 2.

In the operation of the invention fluid from a process stream enters through the channel 20 into the cavity 23 and normally flows out through the channel 21 back into the same process stream. When it is desired to run an analyzer test, some of the fluid from the process stream enters the cavity and is taken through the lines 36, 37 and 42 to the analyzer sample for analyzing the stream. The analyzer stream is then placed back into the process stream downstream from the small particle bypass filter 15.

The inlet 20 enables the fluid to enter cavity 23 tangentially relative to the filter element and support screens 26 and 27. However, with both lines 36 and 37 accepting analyzer filter stream flow, the filter elements can become clogged even through the fluid is swirling in the cavity 23.

To prevent such clogging of the filter screens 26 and 27, the timer illustrated in FIGS. 1 and 2 is a continuous on-off timer which electrically actuates the valve operator which in turn operates the electrically actuated three-way solenoid valve 40 to alternately close and/or open communication between lines 36 and 42, and/or lines 37 and 42. As illustrated in FIG. 1, when the solenoid valve 40 is energized the filter cap line 37 is open and fluid is permitted to flow through the solenoid valve 40 in the direction of the arrows 47 while the line 36 from the filter cap 16 remains blocked. Such blocking action of the line 36 prevents fluid from moving through the filter element and support screen 26 to thus wash the filter element 26 while permitting stream flow through element 27.

At a predetermined time, the timer automatically switches to the off position to enable the filter cap line 36 to communicate with the analyzer line 42 in the direction of the arrow 48 and to block the line 37. This permits the filter element and support screen 27 to be washed similar to filter element and support screen 26 when line 37 is blocked.

As illustrated in an alternative embodiment of FIG. 3, a filter body 15' includes filter caps 16 , 17', a central filter body 18' and filter element and support screens 26' and 27' positioned adjacent a cavity 23', fed from a process stream through inlets 20—20'. A discharge channel 21' enables fluid to be removed from the cavity 23' and moved back into the process stream. A pair of outlet lines 36' and 37' extend through the filter caps 16' and 17', respectively, for communication with the cavity 23'. Each of the lines 36' and 37' are secured at the other end to a three-way valve 40'. A sample analyzer line 42' extends outwardly from such valve 40' for transmitting filtered process streams and fluids during analyzer in the direction of the arrow 50'. It should be noted that in the embodiment described thus far, the embodiments of FIGS. 1 and 2 and FIG. 3 are similar and operate in the same manner.

As further illustrated in FIG. 3, the three-way solenoid valve 40' is electrically connected to a valve operator through leads 41' and the valve operator in turn is electrically connected to a continuous on-off timer through leads 43'.

As illustrated in FIG. 3, the continuous on-off timer is electrically connected through leads 46' to a solenoid valve 46' which is electrically connected to an air supply 50'.

A pair of supply conduits 51' and 52' extend through the air supply 50' and communicate with a cavity 54' centrally formed in a shaft block member 55'. Each of the air supply lines 51' and 52' communicates with the cavity 54' at opposite ends thereof for driving a piston head 55' positioned in such cavity.

A shaft member 56' extends longitudinally through and relative to said block number 55' and is mounted with a cylinder head or piston member 57' such that air flow through the air supply line 51' and the cavity 54' moves the piston member 57' in the direction of the arrow 60'. Conversely, the movement of air in the cavity 54' through air supply line 52' moves the piston member 57' in shaft 56' in a direction opposite from the arrow 60'.

A pair of piston heads 61' and 62' are mounted at opposite ends of the longitudinally extending shaft 56' and are received within cavities 63' and 64', respectively, formed in the block member 55'. Each of the supply lines 36' and 47' extends into and communicates with cavities 63' and 64', respectively, and extends outwardly through said block member 55' for communication with said three-way solenoid valve 40' as set forth hereinabove.

In the operation of the embodiment set forth in FIG. 3, the continuous on-off timer and valve operator operate to continually and alternately block flow through lines 36' and 37' by opening and closing communication between the lines 36' and 42' and the lines 37' and 42' with the solenoid valve 40', as set forth hereinabove with respect to the embodiments of FIG. 1 and 2. Further, in this embodiment actuation of the continuous on-off timer also actuates the solenoid valve 47', which in turn actuates the air supply 50'.

In the example of FIG. 3, with the conduit line 36' open for flow through the three-way solenoid valve 40' in the direction of the arrow 70', the air supply 50' is simultaneously actuated to enable air to flow into the cavity 54' through the air supply line 51' to move the piston 57' upwardly in the direction of the arrow 60'. Upward movement of the piston head 57' moves the shaft 56' also in the direction of the arrow 60' to cause the cylinder or piston heads 61' and 62' to move in the direction of the arrow 60' towards the upward portion of the cavity 63' and 64', respectively. Upward movement of the piston head 62' prevents the inlet and outlet 37a' and 37b', respectively, from communicating with each other because the upward movement of the piston head 62' in the cavity 64' blocks and moves the head 62' between the inlet and outlet 37a' and 37b'.

Since the cavities 62' and 63' separate the lines 36' and 37', respectively, into two branches, fluid transmitted through each of these lines fills the cavities 62' and 63', respectively, as fluid is transmitted through each line.

Movement of the cylinder head or piston head 62' upwardly moves fluid accumulated in the cavity 64' outwardly into the adjacent line of conduit 37'. Some of the fluid moved outwardly into such line 37' moves in the direction of the arrow 71' to cause fluid to move back into the cavity 23' from the line 37'. The movement of fluid from the line 37' through the filter screen 27' into the cavity 23' loosens and washes sludge or other particles collected on the small particle filter screen 27' and maintains the filter 27' clean for continuous usage. It is, of course, to be understood that the piston cylinder 61' operates in the same manner to backwash fluid through the line 36' and into the cavity 23' through the small particle filter 26' to wash such filter when the timer actuates valve 40' to enable the lines 37' and 42' to communicate with each other through the valve 40'.

I claim:

1. An apparatus for continuously washing a bypass filter communicating with an analyzer, the filter including a pair of filter caps housing the filters and communicating with a cavity in a central body filter, the central body filter having an inlet and outlet for continuously accepting and discharging a process stream comprising:
    a. A first outlet line extending through one of the filter caps and communicating with the cavity, wherein fluids moving from the cavity into said outlet line are filtered through the particle filter positioned adjacent the filter cap;
    b. a second outlet line extending through the other of the filter caps and communicating with the cavity, wherein fluids moving from the cavity into said outlet line are filtered through the particle filter positioned adjacent the filter cap;
    c. a three-way solenoid valve receiving each of such opposite ends of said first and second outlet lines;
    d. a third outlet line extending from said three-way solenoid valve to the analyzer system; and
    e. a continuous on-off timer and valve operator electrically connected to said three-way solenoid valve wherein electrical actuation of said solenoid valve enables each of said first and second outlet lines to alternately communicate with said third outlet line and wherein alternate blocking of said first and second lines enables each of the particle filters positioned adjacent said alternately blocked first and second outlets to be washed when said first and second outlets are prevented from communicating with said third outlet.

2. The structure as set forth in claim 1 including:
    a. movable means positioned adjacent each of said first and second outlets for moving fluid in each of said first and second outlets when said outlets are blocked, said movable means backwashing fluid back through the particle filter adjacent the blocked outlet to clean the particle filter.

3. The structure as set forth in claim 2 wherein said movable means includes:
    a. air supply means electrically connected to said continuous on-off timer;
    b. a double actuating cylinder head responsive to the actuations of said air supply means;
    c. means responsive to said double actuating cylinder head for movement relative to each of said first and second outlet lines wherein blocking of one of said outlets causes said means responsive to said double actuating cylinder to move fluid in said blocked outlet back through the particle filter adjacent said blocked outlet.